United States Patent
Jornitz et al.

(10) Patent No.: US 7,048,775 B2
(45) Date of Patent: May 23, 2006

(54) DEVICE AND METHOD FOR MONITORING THE INTEGRITY OF FILTERING INSTALLATIONS

(75) Inventors: Maik Jornitz, Bellport, NY (US); Reinhard Baumfalk, Göttingen (DE); Ralf Lausch, Göttingen (DE); Christian Oldendorf, Göttingen (DE); Oscar-Werner Reif, Hannover (DE)

(73) Assignee: Sartorius AG, Gottingen (DE)

( * ) Notice: Subject to any disclaimer, the term of this patent is extended or adjusted under 35 U.S.C. 154(b) by 138 days.

(21) Appl. No.: 10/491,554

(22) PCT Filed: Oct. 14, 2002

(86) PCT No.: PCT/EP02/11452
§ 371 (c)(1),
(2), (4) Date: Apr. 2, 2004

(87) PCT Pub. No.: WO03/037483
PCT Pub. Date: May 8, 2003

(65) Prior Publication Data
US 2004/0256328 A1  Dec. 23, 2004

(30) Foreign Application Priority Data
Oct. 17, 2001 (DE) .................... 101 51 269

(51) Int. Cl.
*B01D 35/143* (2006.01)
*B01D 37/04* (2006.01)

(52) U.S. Cl. .............. 95/1; 95/19; 95/25; 96/399; 96/417; 96/421

(58) Field of Classification Search .............. 96/417, 96/421, 424, 397, 399; 95/1, 19, 25, 26
See application file for complete search history.

(56) References Cited

U.S. PATENT DOCUMENTS

| | | | |
|---|---|---|---|
| 4,055,075 A * | 10/1977 | Allan et al. | .............. 73/40.7 |
| 5,674,381 A | 10/1997 | Den Dekker | |
| 6,186,140 B1 | 2/2001 | Hoague | |

FOREIGN PATENT DOCUMENTS

| | | | |
|---|---|---|---|
| DE | 196 27 595 A1 | | 1/1997 |
| DE | 100 00 435 A1 | | 7/2001 |
| GB | 2303082 A | * | 2/1997 |
| WO | WO 02/074418 A1 | | 9/2002 |

* cited by examiner

*Primary Examiner*—Robert A. Hopkins
(74) *Attorney, Agent, or Firm*—Anthony J. Casella; Gerald E. Hespos

(57) ABSTRACT

The invention concerns a device and method for monitoring the integrity of filtering installations consisting of a filter housing (1) designed to perform integrity tests and for filtration, equipped with a plurality of filter elements (2, 3) and an electronic testing and monitoring unit (4) designed for monitoring and performing integrity tests, said filter elements (2, 3) having each a storage element and a communicating part (7) being connected to the monitoring and testing unit arranged in the filtering housing, whereon data of said electronic storage elements can be read. The invention also concerns a method for monitoring the integrity of filter installations by means of a plurality of filter elements (2, 3) in a filter housing (1) and of an electronic testing and monitoting unit designed to monitor and perform integrity tests, data stored by electronic storage elements (6) arranged on the filter elements (6) capable of being exchanged with the monitoring and testing unit, identification data and other data concerning the filter elements derived from the electronic storage elements (6) capable of being selected and of constituting the basis for integrity monitoring and testing.

16 Claims, 2 Drawing Sheets

DEVICE AND METHOD FOR MONITORING THE INTEGRITY OF FILTERING INSTALLATIONS

Figure 1:
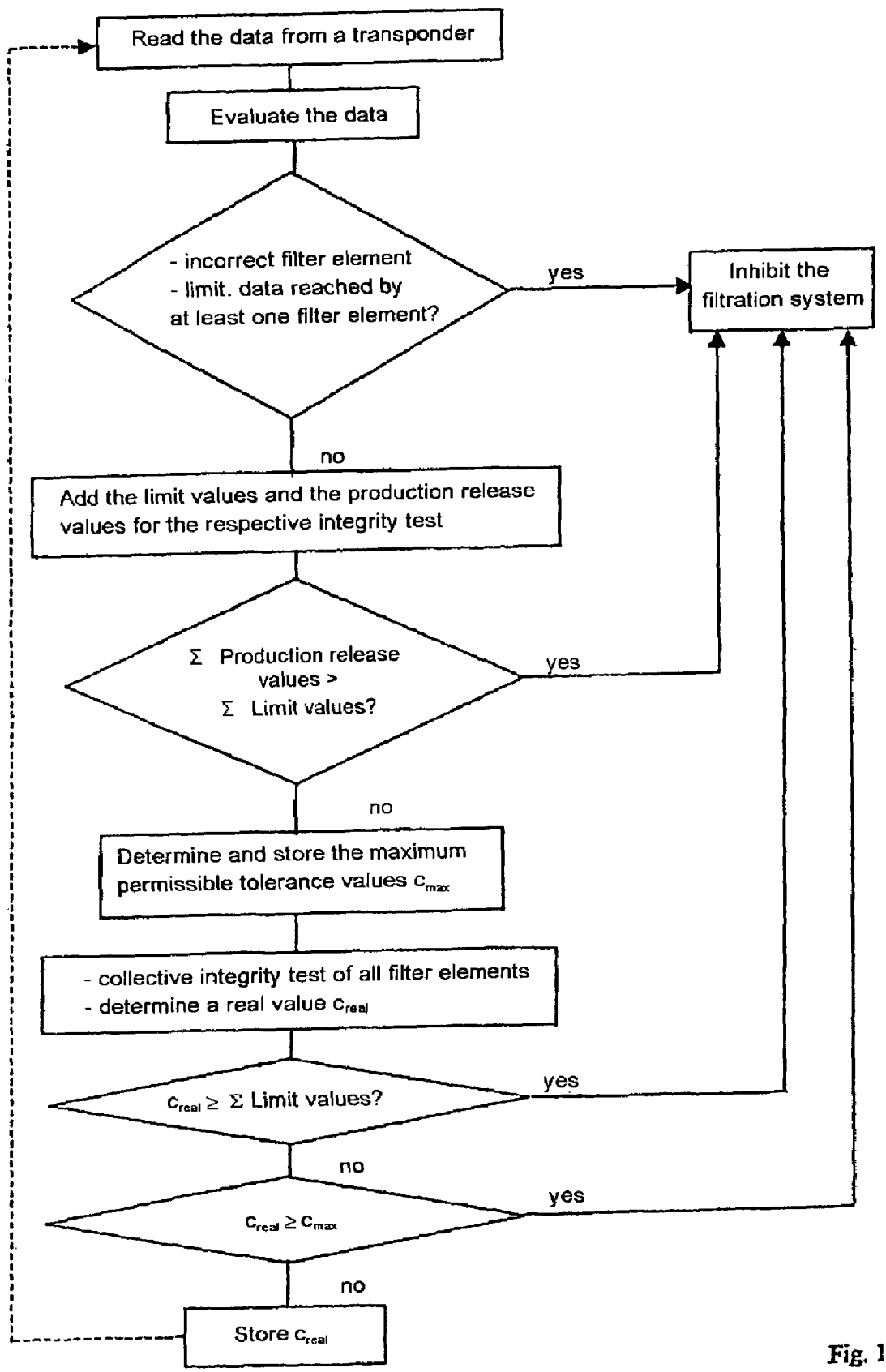

The invention relates to an apparatus for monitoring the integrity of filtration systems comprising a filter housing which is provided for carrying out integrity tests and for filtration and has two or more filter elements and an electronic monitoring and test unit which is provided for monitoring and for carrying out integrity tests.

The invention also relates to a method for monitoring the integrity of filtration systems having two or more filter elements in one filter housing and having an electronic monitoring and test unit which is provided for monitoring and for carrying out the integrity tests.

DE 199 18 419 A1 discloses apparatuses for monitoring the integrity of filtration systems, which have a filter housing which is provided for carrying out integrity tests and for filtration and has two or more filter elements. Apparatuses such as these in this case have an electronic monitoring and test unit which is provided for monitoring and for carrying out the integrity tests, such as that which is also known from DE 39 17 856 A1, for example.

Apparatuses such as these, which have fundamentally been proven, have the disadvantage that, when using two or more filter elements in one filter housing, the electronic monitoring and test unit can in each case determine only overall or sum values for all the filter elements in a filter housing. Since, for example, the diffusion values which are measured in the production release are always lower than the validated limit value, a situation can arise in which a filter element exceeds the limit value without this being noticed. The individual production release values for the filter elements are ignored in apparatuses and methods such as these.

DE 694 01 006 T2 discloses a unit with a single replaceable filter. The unit has an electronic filter identification system with an electronic label on the filter and a reading device on the filter. The reading device is, however, connected to a monitoring unit for the filtration appliance, and this is influenced by the reading device. The electronic label, which is in the form of an electronic memory element, is used in the case of the known apparatus as a filter identification system. The aim of this is to determine whether the specified filter has been installed. Provision is also made for the number of operating hours of the filter to be stored and for the filtration appliance to be switched off when the maximum permissible number of operating hours has been reached. This document does not provide those skilled in the art with any information relating to the use of such units for monitoring the integrity of filtration systems and, in particular, the use of filter housings with two or more filter elements.

The object of the present invention is therefore to improve the known apparatuses for monitoring the integrity of filtration systems having two or more filter elements, such that the reliability is improved and the production release values for the individual filter elements can be taken into account.

This object is achieved in an apparatus for monitoring the integrity of filtration systems comprising a filter housing which is provided for carrying out integrity test and for filtration and has two or more filter elements and an electronic monitoring and test unit which is provided for monitoring and for carrying out integrity test, in that the filter elements each have an electronic memory element, and in that a communication part is arranged in the filtration housing, and is connected to the monitoring and test unit, and via which data can be read from the electronic memory elements.

Since each filter element has an electronic memory element, the monitoring and test unit can read the production release values for the individual filter elements, and can take them into account in the integrity monitoring. The reliability of the integrity measurement can be considerably improved by the use of tested production values and production release values.

According to one preferred embodiment of the invention, data from the monitoring and test unit can be written to the electronic memory element.

Since the monitoring and test unit can write to the electronic memory elements, test data can be measured and written to the memory element throughout the life of the filter elements. The apparatus according to the invention is thus able to store multiple measurements, to transmit them and to process them by means of a reading device. This makes it possible, for example, to record test data changes, to process them and/or to signal them. The apparatus according to the invention thus makes it possible to identify and take into account any test data drift.

According to a further preferred embodiment of the invention, the electronic memory elements are in the form of transponders, and the communication part is in the form of an antenna for transmitting and receiving radio-frequency signals, so that data can be interchanged between the electronic monitoring and test unit and the transponders.

Transponders can be read from and written to, if required, without any contact being made, with no visual contact being required to the read/write station or to the communication part. User-defined data may in this case be stored without any problems on the microchip in the transponder. Furthermore, transponders can be protected by means of a password.

According to a further preferred embodiment of the invention, the electronic memory elements or transponders contain the following data for the respective filter element: identification data, data limiting use and/or production release values for a pressure maintenance test and/or diffusion test and/or bubble point test and/or water intrusion test.

Since the identification data and the data which limits use, such as the life, maximum permissible number of regeneration or sterilization cycles, and limit values for the individual filter elements are permanently stored in the electronic memory elements, the installation of incorrect filters is rapidly identified, and transmission errors in the limiting data to the monitoring and test unit are reliably prevented. Storage of the production release values for the known integrity tests further improves the reliability and accuracy of the integrity tests.

According to a further preferred embodiment of the invention, the electronic memory element for each filter element has an individual address of an address identifier which enables a reading and/or transmitting process. The individual addresses with an address identifier allow the electronic memory elements for the individual filter elements to be read and written to specifically.

In principle, it is also possible for the filter housing to have only one filter element instead of two or more filter elements.

The known methods for monitoring the integrity of filtration systems having two or more filter elements have the disadvantages mentioned above.

A further object of the invention is thus to improve the known methods such that possible errors in the monitoring of the integrity of filtration systems having two or more filter elements in one filter housing are reduced, and the reliability of the monitoring is improved.

This object is achieved in a method for monitoring the integrity of filtration systems having two or more filter elements in one filter housing and having an electronic monitoring and test unit which is provided for monitoring and for carrying out the integrity test, in that data which is stored in electronic memory elements that are arranged on the filter elements is interchanged via a communication part with the monitoring and test unit, with identification data and further specific data for the filter elements being read from the electronic memory elements and being used as the basis for further monitoring and for the integrity test.

The storage of specific data for the filter elements and the reading and supplying of the data to the monitoring and test unit considerably improve the reliability of the integrity test.

According to one preferred embodiment of the invention, real test values which have been determined are stored in the memory elements and are used for evaluation when another measurement is carried out.

The storage and reading of real test values additionally improves the analysis and assessment of the measurement results.

According to a further preferred embodiment of the invention, the monitoring and integrity method comprises the following steps:

a) the data is read from the electronic memory elements for the filter elements,
b) the data is evaluated in order to determine whether the correct filter elements are installed in the filter housing and/or whether the limiting data has been reached by at least one filter element,
c) the filtration system is inhibited if at least one filter element has been determined not to be correct and/or if at least one filter element has reached or exceeded the limiting data,
d) if no inhibiting is carried out on the basis of c), limit values and production release values for the respectively intended integrity test are added up,
e) the filtration system is inhibited if the sum of the production release values exceeds the sum of the limit values,
f) if no inhibiting is carried out on the basis of e), a maximum permissible tolerance value for the intended integrity test is determined and stored in the monitoring and test unit, with the tolerance value being the sum of the individual production release values b plus the maximum permissible (individual) tolerance value, and the maximum permissible (individual) tolerance value being the smallest difference between the individual limit value and the individual production release value of one of the filter elements,
g) a collective integrity test is carried out,
h) the real value of the integrity test as determined on the basis of step g) is compared with the sum of the production release values added up on the basis of step d) and the maximum permissible tolerance value as determined on the basis of step f),
i) the filtration system is inhibited if the real value has reached or exceeded the sum of the values based on steps d) and f).

The steps described above on the one hand reduce the possibility of faults in the integrity of the filtration system, and on the other hand ensure with better accuracy that the filtration system is inhibited when limit values or maximum permissible tolerance values are exceeded (diffusion and/or pressure drop and/or water intrusion limit value) or are undershot (bubble point and/or bubble pressure point limit value).

According to a further embodiment of the invention, the real value from a collective integrity test of all of the filter elements is stored, and its result is taken into account in another integrity test.

If multiple measurements are carried out, changes can thus be identified and conclusions can be drawn about the behavior of the filtration system.

According to a further embodiment of the invention, the status of the system is monitored by additional steps for the accumulated reading of data for the filtration time and/or for the cycles for regeneration and sterilization by means of the monitoring and test unit into the electronic memory elements.

According to a further preferred embodiment of the invention, any test data drift is determined by comparison of the stored real values, and the further integrity behavior of the filter elements is predicted using an algorithm, with replacement of filter elements being initiated shortly before it is predicted that the limit values will be exceeded.

This makes it possible to react, and to replace the filter elements, even before the limit values are reached or exceeded. This reliably avoids the production of scrap filtrate or filtrate with undesirable values.

The system according to the invention reads and/or writes measured and/or stored data which is available and/or stored in the memory element, and/or is intended to be stored in the memory element. The system and the apparatus can measure test data throughout the life of the filter elements, and/or can store test data in the memory element. The system according to the invention is thus able to store multiple measurements, to transmit them, and to process them by means of a reading device. The system according to the invention can thus record test data changes, can process them, and/or signal them. The system according to the invention is thus able to record, to process and to signal a test data drift from the limit value and/or start value. The system can therefore compare any test data drift with a predetermined permissible test data drift and, if appropriate, can stop the system and/or can prevent the start of filtration. This capability is used in particular for multiple filter element systems, as well as for individual elements and/or tangential flow filter elements.

Test data drift processing of the system according to the invention can also be used to predict when the filter installation and/or filter system will fall below or exceed the limit value. The system according to the invention can thus either process the data from a multiple measurement in the form of a graphic and/or can signal on the basis of a predetermined algorithm when the filter system must be replaced; this is done either as a result of limit values being exceeded or undershot, and/or by blocking and/or by other predetermined process parameters. The system according to the invention can also trigger an alarm, which can lead to replacement of the filter elements, since the filter elements will fall below or exceed the limit values when they are next used.

Further details of the invention will become evident from the following detailed description and from the attached drawings, in which preferred embodiments of the invention are illustrated by way of example.

In the drawings:

FIG. 1: shows a schematic method procedure, and

Figure 2:
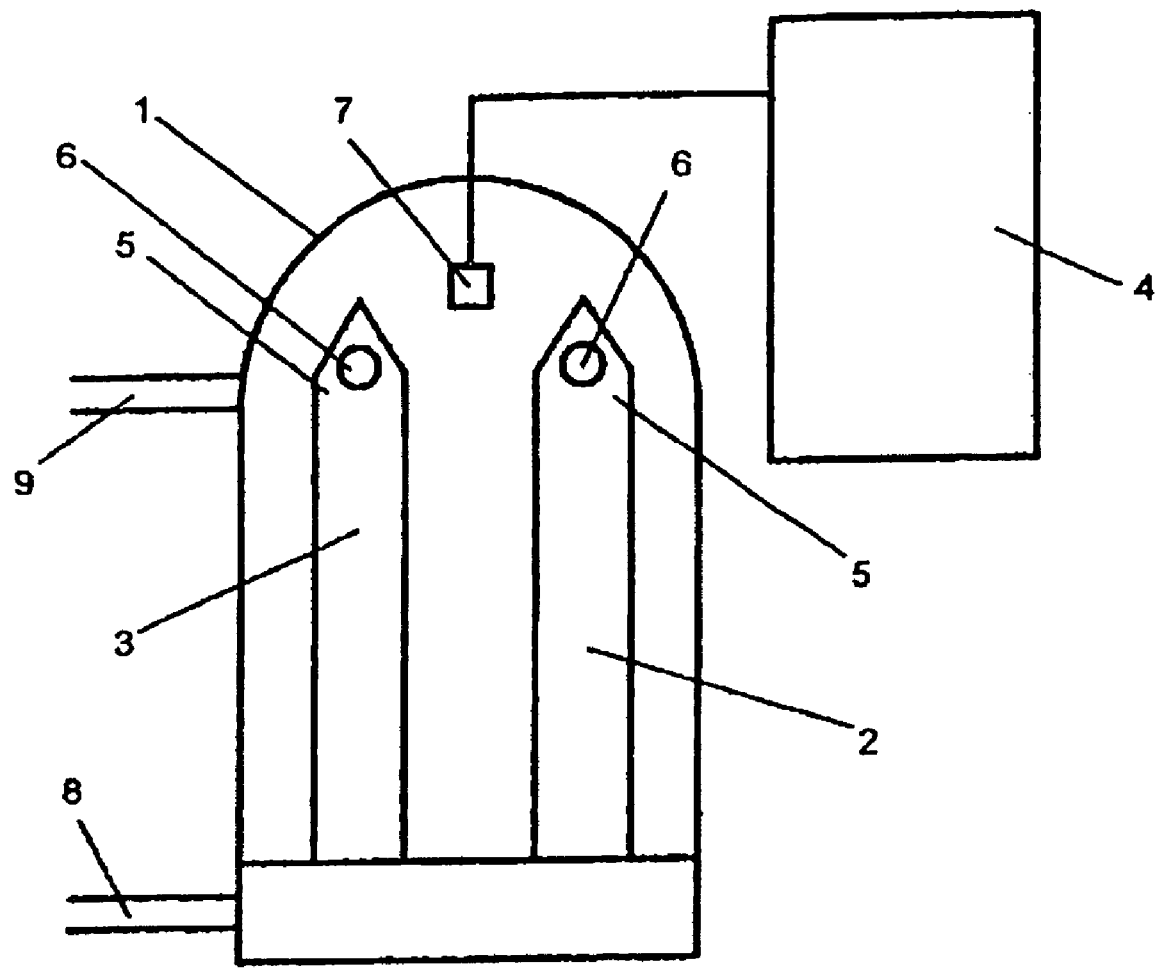

FIG. 2: shows a schematic illustration of an apparatus for monitoring the integrity of filtration systems.

An apparatus for monitoring the integrity of filtration systems essentially comprises a filter housing 1, a first filter element 2 and a filter element 3, or two or more filter elements 2, 3, and an electronic monitoring and test unit 4.

The monitoring and test unit 4 is connected in a known manner via lines, which are not illustrated, to sensors and actuators, which are not illustrated, for monitoring and measuring the integrity of the filter elements 2, 3 or of the filtration system.

The filter elements 2, 3 each have a transponder 6 at their upper ends 5. The transponder 6 essentially comprises a microchip, which is not illustrated, as an electronic memory element, and a coil which forms the receiving and transmitting antenna. The transponder 6 is in the form of a read/write transponder and can be protected by means of a password.

A communication part which is in the form of an antenna 7 and is connected to the monitoring and test unit 4 is arranged adjacent to the transponders 6 on the filter housing 1. The antenna 7 is designed to transmit and receive radio-frequency signals, so that data can be interchanged between the electronic monitoring and test unit 4 and the transponders 6.

The medium to be filtered is supplied to the filter housing 1 via a supply line 8, and the filtrate is carried away via a line 9.

The monitoring and test unit 4 uses the communication part and the antenna 7 to read test and/or product data from individual and/or from two or more filter elements 2, 3, and from their transponders 6. The test and/or product data is processed by the monitoring and test unit 4.

If there are two or more filter elements 2, 3, the data, for example integrity values, from all of the transponders 6 or memory elements is read individually and is added. The sum of all of the limit values gives the limit value for the integrity test before or after the use of the multiple filter system. The limit values which are stored in the transponder 6 may be the values measured during the production release (production release values) and/or the limit values a as determined by validation procedures. In this case, the limit values relate to all the integrity test methods, for example a pressure drop test, a diffusion test, a bubble point test or bubble pressure point test and/or a water intrusion test. If the measured limit value differs from the predetermined limit value, the start of the filtration process is stopped, and the filtration system is inhibited.

Limit value fluctuations during the measurements may be recorded and compensated for by means of a predetermined algorithm in the system according to the invention and/or, if required, they may be predetermined as a tolerance. The predetermined tolerance relating to the determined and/or predetermined limit value may be established by validation or qualification. During the reading process, the product characteristic data for each individual filter element is also checked, and is compared with predetermined data. If any discrepancies are found, the start of the filtration process is prevented and, if appropriate, an alarm is triggered.

EXAMPLE 1

Multiple filters comprising a filter housing 1 and/or a filter system with 12 filter elements 2, 3, which are tested for integrity by means of the pressure drop and/or diffusion test. This test is carried out before and/or after the filtration. In this case, the maximum pressure drop and/or diffusion limit values (as specified by the filter manufacturer) for each individual filter element are normally added to form an overall limit value, for example 12×45 ml/min diffusion limit value, that is to say a total limit value of 540 ml/min. The limit value a of 45 ml/min was determined by validation tests, and is a fixed value. This value often includes a safety margin, which is often not reached during the production release. Test values below the limit value a are measured relatively frequently. The invention now uses the actually measured data from the production release, the production release values b, and stores these in the individual electronic memory element or transponder 6 for the filter elements 2, 3. This is illustrated in the following table.

| Filter element No. | Limit value a (ml/min) | Production release value b (ml/min) | Possible fault source (ml/min) |
| --- | --- | --- | --- |
| 1 | 45 | 30 | 30 |
| 2 | 45 | 26 | 26 |
| 3 | 45 | 30 | 30 |
| 4 | 45 | 29 | 29 |
| 5 | 45 | 29 | 29 |
| 6 | 45 | 26 | 26 |
| 7 | 45 | 30 | 30 |
| 8 | 45 | 28 | 28 |
| 9 | 45 | 28 | 28 |
| 10 | 45 | 29 | 29 |
| 11 | 45 | 27 | 27 |
| 12 | 45 | 27 | 65 |
| Total | 540 | 339 | 377 |

The diffusion values or production release values b which are measured during the production release are always less than the validated limit value a, so that a situation can arise in known systems in which a filter element exceeds the limit value a without this being noticed. The integrity test set or the monitoring and test unit 4 measures only the sum of all the filter elements (377 ml/min) and compares this data with the sum of all the limit values a (540 ml/min). In this case, the filter system would pass the test, although this would be incorrect since a single filter element had exceeded the limit value of 45 ml/min by being at 65 ml/min. This cannot be detected in the total. The present invention now uses the tested production release values b and stores each measured value in the memory element or transponder 6 for the respective filter element 2, 3. This test data is read during use of the filter elements 2, 3 and is combined as a limit value, in the example 339 ml/min. If one filter element now exceeds the limit value, this is immediately evident, and can thus be recorded.

The maximum step value as the difference between the limit value a and the production release value b for the filter element 2 with the highest diffusion value may be regarded as the tolerance. For example, the maximum limit value for two 30" filter elements 2, 3 is 90 ml/min. The value actually measured in production is 25 ml/min for one filter element 3 and 26 ml/min for the other filter element 2. The maximum step value or (individual) tolerance value is now 45 ml/min minus 26 ml/min=19 ml/min. This (individual) tolerance value $c_1$ is now added to the measured total diffusion or sum of the individual production release values b in order to determine the maximum permissible tolerance value $c_{max}$ and the maximum permissible diffusion value for the overall system, that is to say 25 ml/min+26 ml/min+19 ml/min=70 ml/min. These values are summarized in the following table.

| Filter element | Limit value a (ml/min) | Production release value b (ml/min) | Tolerance value c (ml/min) |
|---|---|---|---|
| 1. Filter element 2 | 45 | 26 | a − b = 19 |
| 2. Filter element 3 | 45 | 25 | a − b = 20 |
| Σ | 90 | 51 | $c_{max} = \Sigma b + c_1 = 70$ |

By way of example, FIG. 1 shows the steps in a method according to the invention. After reading the data from the transponders 6 for the individual filter elements 2, 3, the data is evaluated. If any incorrect filter elements and/or limiting data from at least one filter element 2, 3 are/is found, the filtration system is inhibited, and the filtration process is stopped. If no incorrect filter elements have been found or no limiting data has been reached, the limit values a are added to the production release values b for the respective integrity test. If the sum of the production release values b is greater than the sum of the limit values a or is equal to it ($\Sigma a \geq \Sigma b$), then the filtration system is likewise inhibited. If the sum of the production release values b is less than the sum of the limit values a, the maximum permissible tolerance values $c_{max}$ are determined and stored on the basis of the method described above. After a collective integrity test of all the filter elements and determination of a real value $c_{real}$, a check is carried out to determine whether the real value is greater than or equal to the sum of the limit values a. If this is the case, the filtration system is likewise inhibited. If this is not the case, a check is carried out to determine whether the real value $c_{real}$ is greater than or equal to the maximum permissible tolerance value $c_{max}$. If this is the case, the filtration system is inhibited. If this is not the case, the real value $c_{real}$ is stored.

The invention claimed is:

1. An apparatus for monitoring the integrity of filtration systems comprising a filter housing which is provided for carrying out integrity tests and for filtration, said filter housing including two or more filter elements and an electronic monitoring and test unit which is provided for monitoring and for carrying out integrity tests, each filter element including an electronic memory element, having a communication part that is arranged in the filtration housing and is connected to the monitoring and test unit, and via which data can be read from the electronic memory elements; said apparatus further comprising at least one of (i) means for determining whether the filter elements in said filter housing are the correct filter elements and a means for inhibiting said apparatus if at least one filter element has been determined not to be correct and/or (ii) means for determining if limiting data has been reached by a filter element and a means for inhibiting said apparatus if at least one filter element has reached or exceeded said limiting data.

2. The apparatus as claimed in claim 1, wherein the data from the monitoring and test unit can be written to the electronic memory element.

3. The apparatus as claimed in claim 1, wherein the electronic memory elements are in the form of transponders and the communication part is in the form of an antenna for transmitting and receiving radio-frequency signals for interchanging data between the electronic monitoring and test unit and the transponders.

4. The apparatus as claimed in claim 1, wherein the electronic memory elements contain at least the following data for each filter element: the identification data, data limiting use and/or production release values for a pressure maintenance test and/or diffusion test and/or bubble point test and/or water intrusion test.

5. The apparatus as claimed in claim 1 for an electronic memory element for each filter element has an individual address with an address identity in order to enable a reading and/or transmitting process.

6. In a method for monitoring the integrity of filtration systems having two or more filter elements in one filter housing and having an electronic monitoring and test unit which is provided for monitoring and for carrying out the integrity tests, the improvement wherein data which is stored in electronic memory elements that are arranged on the filter elements is interchanged via a communication part with the monitoring and test unit, with identification data and further specific data comprising limiting data for the filter elements being read from the electronic memory elements and being used as the basis for further monitoring and for the integrity test, wherein said improvement further comprises evaluating the data in order to determine at least one of (i) whether the correct filter elements are installed in the filter housing and inhibiting the filter system if at least one filter element has been determined not to be correct and/or (ii) whether the limiting data has been reached by at least one filter element and inhibiting the filter system if at least one filter element has reached or exceeded the limiting data.

7. The method as claimed in claim 6, wherein real test values which have been determined are stored in the memory elements and are used for evaluation when another measurement is carried out.

8. In a method for monitoring the integrity of filtration systems having two or more filter elements in one filter housing and having an electronic monitoring and test unit which is provided for monitoring and for carrying out the integrity tests, the improvement wherein data which is stored in electronic memory elements that are arranged on the filter elements is interchanged via a communication part with the monitoring and test unit, with identification data and further specific data for the filter elements being read from the electronic memory elements and being used as the basis for further monitoring and for the integrity test; wherein real test values which have been determined are stored in the memory elements and are used for evaluation when another measurement is carried out; said improved method comprising the following steps:
   a) reading the data from the electronic memory elements for the filter elements,
   b) evaluating the data in order to determine whether the correct filter elements are installed in the filter housing and/or whether the limiting data has been reached by at least one filter element,
   c) inhibiting the filtration system if at least one filter element has been determined not to be correct and/or if at least one filter element has reached or exceeded the limiting data,
   d) if no inhibiting is carried out on the basis of step (c), limit values (a) and production release values (b) for the respectively intended integrity test are added up,
   e) inhibiting the filtration system if the sum of the production release values exceeds the sum of the limit values,
   f) if no inhibiting is carried out on the basis of step (e), determining a maximum permissible tolerance value ($c_{max}$) for the intended integrity test and storing the maximum permissing tolerance value in the monitoring and test unit, g) carrying out a collective integrity test, h) comparing the real value ($c_{real}$) of the integrity test as determined on the basis of step (g) with the sum of the production release values added up on the basis of step (d) and the maximum permissible tolerance value as determined on the basis of step (f), i) inhibiting the filtration system if the real value ($c_{real}$) has reached or exceeded the sum of the values based on steps (d) and (f).

9. The method as claimed in claim 7, characterized in that the maximum permissible tolerance value ($c_{max}$) is formed from the sum of the production release values (b) and the minimum difference formed from individual limit values (a) and production release values (b).

10. The method as claimed in claim 8, characterized in that only the production release values (b) are added up in step (d), and step (f) is omitted.

11. The method as claimed in one of claim 8, characterized in that the real value ($c_{real}$) is stored, and is taken into account in another integrity test.

12. The method as claimed in claim 8, characterized in that additional steps are carried out for the accumulated reading of data for the filtration time and/or for the cycles for regeneration and sterilization by means of the monitoring and test unit (4) into the electronic memory elements.

13. The method as claimed in claim 8, characterized in that the electronic memory elements are in the form of transponders and are addressed via an individual address, and in that the communication part, acting as a transmitting unit, sends an address with data for reading in, and an address with a read request.

14. The method as claimed in claim 8, characterized in that the electronic memory elements for the filter elements are in the form of transponders and are addressed via different frequencies.

15. The method as claimed in claim 8, characterized in that any test data drift is determined by comparison of the stored real values ($c_{real}$).

16. The method as claimed in claim 15, characterized in that the filter elements are replaced before limit values are exceeded, taking into account the test data drift.

* * * * *